Aug. 26, 1947.                F. L. LATHROP                    2,426,398
               GRAVITY LIQUID SEPARATOR FOR POTATOES
                      Filed Aug. 8, 1944           3 Sheets-Sheet 1
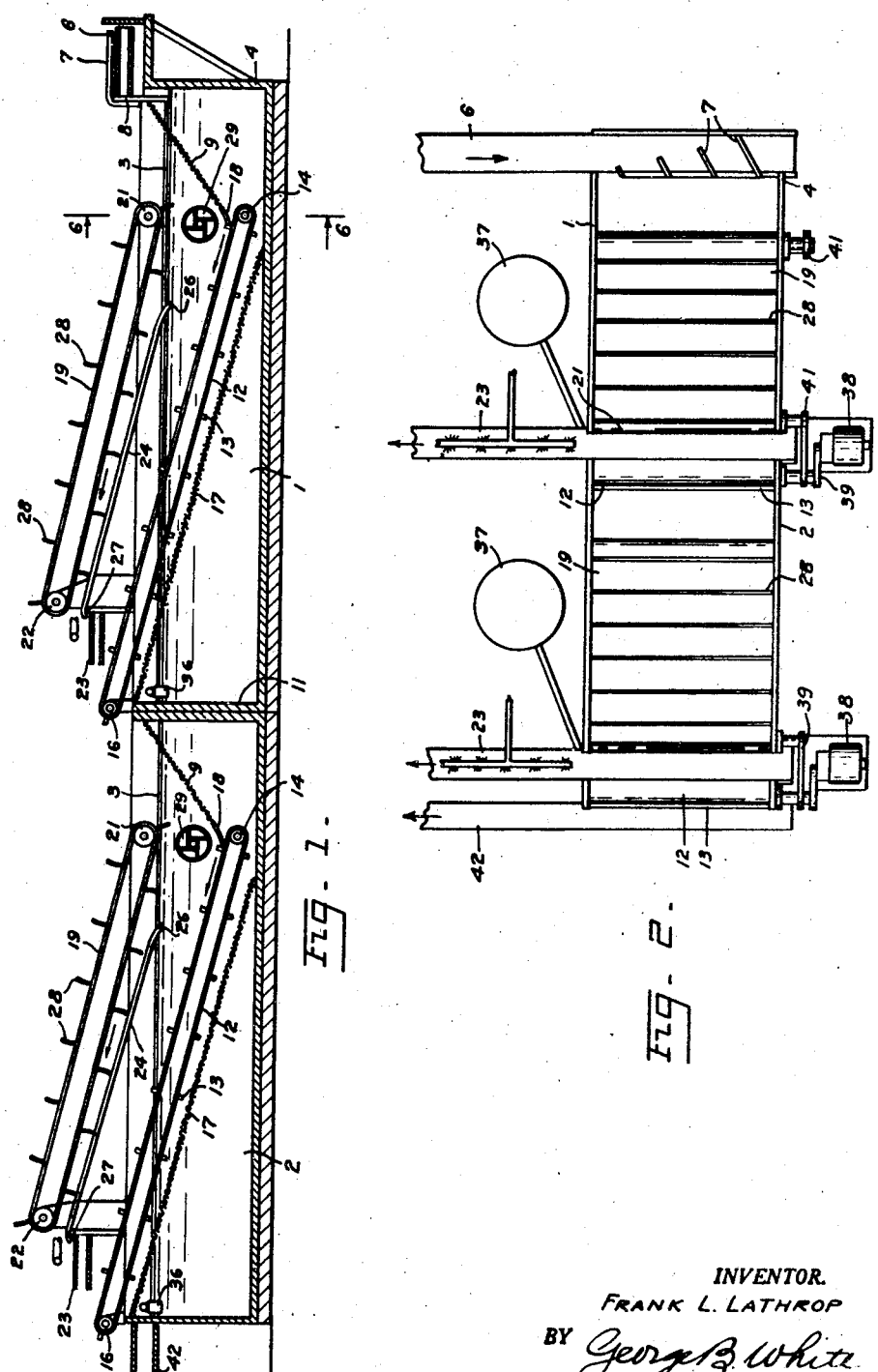
INVENTOR.
FRANK L. LATHROP
BY George B. White
ATTORNEY Aug. 26, 1947.    F. L. LATHROP    2,426,398
GRAVITY LIQUID SEPARATOR FOR POTATOES
Filed Aug. 8, 1944    3 Sheets-Sheet 2
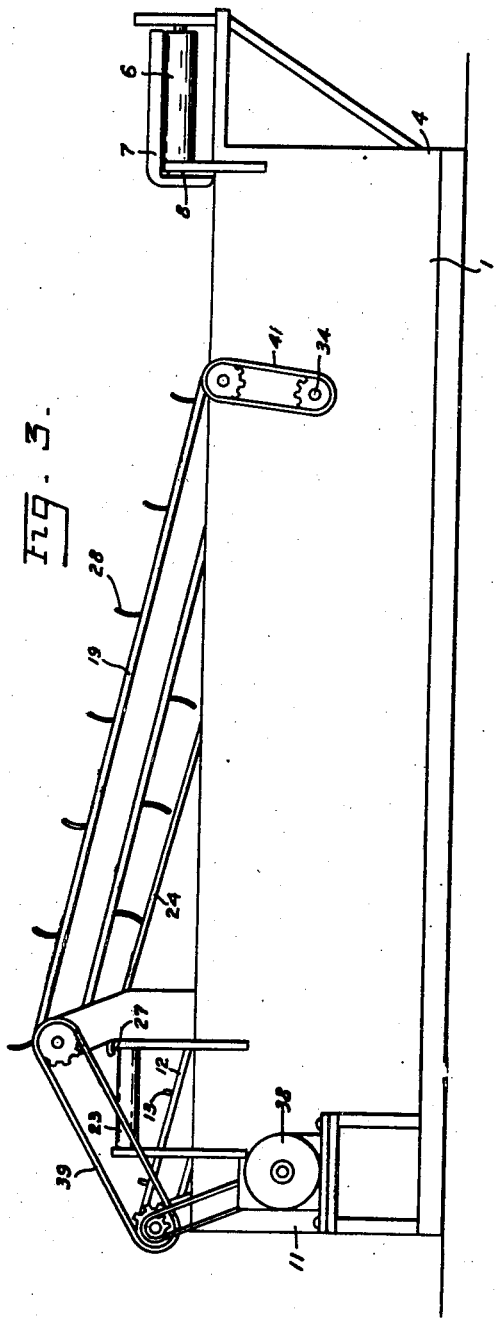
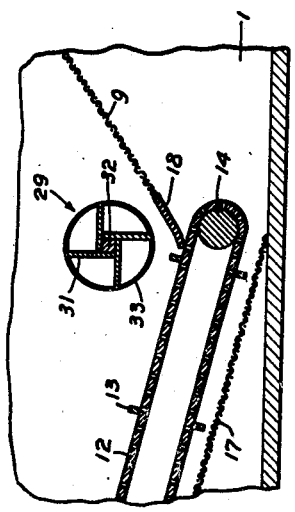
INVENTOR
FRANK L. LATHROP
BY George B. White
ATTORNEY INVENTOR.
FRANK L. LATHROP
BY George B. White
ATTORNEY Patented Aug. 26, 1947

2,426,398

UNITED STATES PATENT OFFICE 2,426,398

GRAVITY LIQUID SEPARATOR FOR POTATOES

Frank L. Lathrop, Merrill, Oreg.

Application August 8, 1944, Serial No. 548,610

2 Claims. (Cl. 209—173)

This invention relates to a device for grading potatoes and other root crops.

The devices heretofore used for grading potatoes and other root crops for particular specifications involved a manual selection based upon visual inspection. There have been screen shakers and rubber rollers which threw out culls and graded potatoes and other root crops according to size and shape, but such grading did not accomplish the separation of the potatoes and other crops according to the characteristics of their internal composition. All known processes of grading at present, are limited by the frailty of the human equation and are not capable of grading potatoes and similar root crops according to quality instead of exterior visual characteristics.

The primary object of the invention is to provide a device for grading potatoes and other root crops which eliminate visual selection and guess work and most of the manual labor, and which is a purely automatic method of selection on the basis of the qualities in the composition of the root crops, accomplished on a highly scientific basis, and particularly based upon the definite relationship between the specific gravity and the relative density of such products of the soil; while the invention herein will be described primarily in connection with the grading of potatoes, it is to be understood that the same method and device is applicable to other root crops in which such relationship exists between the specific gravity and the relative density or composition or starch content.

Another object of the invention is to provide a device which facilitates the grading of potatoes and the like on the basis of the relation between specific gravity and the relative density which are dependent on the percentage of solids or dry matter of the contents of the potatoes; and in which method and device such separation is quickly and automatically achieved.

Another object of the invention is to provide a method and device for grading potatoes and the like wherein the quality for the grading is measured by the chemical composition or the characteristic of the internal composition and the dependent specific gravity, and wherein the separation is automatically accomplished by the control of a liquid solution to float off the potatoes and other root crops the specific gravity of which is lower than that of the solution.

Another object of the invention is to provide a device for grading potatoes and other root crops by introducing the potatoes into a liquid solution of controlled density, floating off the potatoes which do not have the quality corresponding to the desired specific gravity, then transferring the potatoes which are of a quality above the desired specific gravity into subsequent stages of separation in the higher density groups, and accordingly separate the potatoes into various grades dependent on respective density of the desired starch content.

Another object of the invention is to provide a device for rendering more efficient the grading of potatoes and the like according to the hereditary qualities, namely: the starch content or density, by separation of the various grades according to the specific gravities, and thereby to provide potatoes of uniform content for consumption, or for industrial or seed stock purposes.

Other objects of the invention together with the foregoing will be set forth in the following description of the preferred method and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my claims. An illustrative embodiment for the device for carrying out my invention is clearly shown in the accompanying drawings, wherein:

Fig. 1 is a somewhat diagrammatic sectional view of my invention.

Fig. 2 is a somewhat diagrammatic plan view of my invention.

Fig. 3 is a side elevation of a single unit of my apparatus.

Fig. 4 is a fragmental sectional detail of the device showing the lower end of the lower grading conveyor and its relation to the perforated intake guide.

Figure 5:
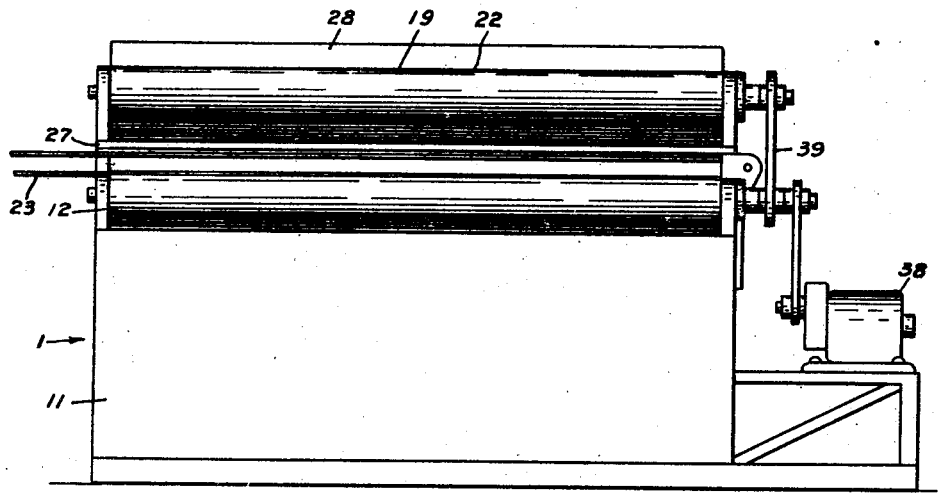
Fig. 5 is an end view of the first unit of the device viewing it from the discharge end.
Figure 6:
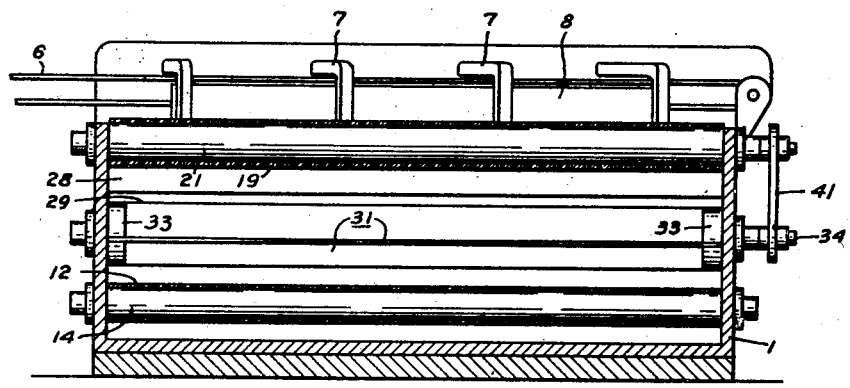
Fig. 6 is a sectional view of one of the units, the section being taken on 6—6 of Fig. 1.

The visual inspection method of grading potatoes and other root crops according to exterior characteristics such as shape, size and exterior defects fails to provide a uniform product for consumer use or for industrial purposes, such as the manufacture of dehydrated potatoes, potato chips or the like, or for seed stock. Uniformity for such purposes depends not on the exterior shape and size of the potatoes but on the starch content and other dry matter content. The solid content in potatoes is primarily starch. This is of some importance to the consumer, and it is of still greater importance where the starch content of the potato is used for making industrial products, such as dehydrated potatoes or potato chips. In view of the fact that the solid starch content of potatoes is a hereditary characteristic and quality, more uniformity can be accomplished in the growing of the potatoes for particular purposes when the seed stock is graded according to the desired quality. This grading must be accomplished rapidly and it must be reliable, and it also must minimize mechanical injuries which are quite extensive in connection with grading processes and devices heretofore used.

The method and device herein is predicated on the scientific principle that the relative density of the potato determines its specific gravity and it is dependent on the percentage of solids or dry matter of the contents. High specific gravity of a potato indicates high solid content and low water content, relatively. Low specific gravity of a potato indicates low solid content and high water content, which is a relatively lower grade potato.

My method of grading potatoes includes the step of feeding the potatoes into a solution of predetermined density, preferably a suitable salt solution in water. The solution is agitated for advancing the potatoes over a conveyor for automatically removing the potatoes of higher specific gravity which sink in said solution and transferring into another solution of still higher density said potatoes of higher specific gravity. Then the potatoes of lighter specific gravity which float at the surface of said solution are skimmed off and removed. The potatoes floating in the second solution are similarly skimmed and carried away and graded as being between the specific gravity of the first and the second solutions. Then the same steps are repeated as many times as necessary for the number of grades desired.

It was found experimentally that the salt saturation in water can be predetermined with relation to the specific gravity and starch equivalent of the various grades of potatoes. For example, a lower grade of potato has a specific gravity of about 1.075 and the corresponding starch equivalent of 12.9, which would float in salt solution of about 10.5 per cent saturation. An intermediate grade of potato will have a specific gravity of approximately 1.09 with a corresponding starch content of 16.1 and will float in a salt saturation in the solution of about 12.8 per cent. The relatively highest grade potato has a specific gravity of 1.11, a corresponding starch content of 18.2 and will float in salt solution of about 14 per cent saturation. These are merely illustrative grades, but it is to be understood that the range of grading may run from a specific gravity of 1.06 to 1.11, or may be even a larger range. For practical purposes it was found that grading into three grades will suffice, but if required, grading into several other grades can be accomplished by several steps using solutions of corresponding different percentages of saturation.

It is to be noted that in this grading, the percentage of the solution is predetermined so that the desired good quality potatoes sink, and all potatoes lighter than the desired quality float. The density of a potato is a definitely measurable characteristic. Consequently, if the density of the salt solution is properly selected, then all potatoes below the specific gravity of the solution will float and the potatoes of higher specific gravity will sink and can be graded and regraded. The density being correlated with the starch content of potatoes, the grading will result in potatoes uniformly above a predetermined starch content in each grade. In certain instances, especially in connection with seed stock, it is desirable to treat the potatoes against certain diseases, and in such instances the solution also contains the necessary insecticide for simultaneously dipping and grading the potatoes. After the grading, the graded potatoes are rinsed in order to remove from their surface the salt that may adhere to them. When insecticide is used on seed stocks the rinsing is dispensed with.

In the illustrative device shown in the drawings herein, the device grades for three grades, but it is to be noted that by additional units grading into several more grades can be accomplished by suitably predetermining the percentage of salt solutions in a series of containers. In the present illustration two tanks, 1 and 2, are arranged in series. Each tank contains a salt solution to a predetermined level 3. The density of the salt solution in the first tank 1 is lower than the density in the second tank 2. For instance, referring to the three grades of examples heretofore mentioned, the solution in the first tank will be about 1.075. In the first tank 1, therefore, all potatoes above the grade of 1.075 specific gravity or the corresponding starch content of 12.0 will sink, and all the potatoes lighter than the specific gravity of 1.075 will float. The potatoes which sink in the first tank 1 are then transferred into the second tank 2 which in the present illustration will be of a solution of about 12.8 per cent of saturation so that all the potatoes of 1.09 specific gravity and lighter will float and the others will sink.

At the intake end 4 of the first tank 1 is provided a transverse conveyor 6 which carries the potatoes to the intake end 4 of the tank 1. The conveyor 6 preferably overlaps the entire width of the intake end 4 of the tank 1. It is to be noted that the intake conveyor 7 is comparatively long and that culls are picked off of this conveyor in the usual manner before the potatoes reach the tank 1. These culls are carried away in any usual manner. Above the portion of the conveyor 6 overlapping the intake end 4 of the tank 1 are provided a plurality of shearing elements, which, in the present form, are illustrated as bars 7 of gradually increasing length slanting in a herring bone fashion transversely and opposite the direction of the conveyor movement. Namely, the bar 7 near the end of the conveyor extends over the entire width of the conveyor 6 and the other bars 7 are consecutively shorter in length, the first bar at the intake end being the shortest. The bars 7 are supported on a vertical bracket 8 which extends downwardly around and below the conveyor 6 and is suitably attached to the intake end wall 4 of the tank 1. As the potatoes advance on the conveyor 6, these bars 7 shear off the potatoes and guide them toward the tank 1 so that the potatoes drop into the solution in the tank 1 evenly across the width of the tank.

From the top of the intake end 4 of the tank 1 extends downwardly and away from said end 4 a guide screen 9. This guide screen 9 extends across the entire width of the tank 1 and the potatoes discharged from the conveyor 6 roll down on the guide screen 9. Such of the potatoes that are of a specific gravity higher than the specific gravity of the solution will travel downwardly on the guide screen 9 as they sink in said solution. The potatoes which are of lighter specific gravity than the solution will float near or at the surface level 3 of the solution in the tank 1.

From the bottom of the tank 1 and from below the screen guide 9 extends upwardly and toward the discharge end 11 of the tank 1 a conveyor 12 which is of the usual woven wire or screen type conveyor with transverse conveyor flights thereover. The lower end of the conveyor 12 is played around a sprocket 14 located below the lower end of the screen guide 9. The discharge end or upper end of the conveyor 12 is played around another drive sprocket 16 or the like which is above and projects beyond the discharge end 11 of the tank 1 so that the potatoes carried by the conveyor 12 are discharged from it into the second tank 2. Under the conveyor 12 and parallel with it is another screen 17 which allows the dirt particles to drop through but does not allow the potatoes to sink below the conveyor 12. Both the conveyor 12 and the screen 17 therebelow extend across the full width of the tank 1. On the lower end of the screen guide 9 is provided a flexible, preferably rubber or composition lip or flap 18 to prevent the potatoes from getting under the screen guide 9 but yielding under the cross or transverse flights 13 of the conveyor 12 when the slats 13 are brought around the lower sprocket 14 for picking up the potatoes and carrying them upwardly on said conveyor 12.

The floating potatoes are carried off by a claw conveyor 19, the lower end of which is placed around suitable sprockets or drive rollers 21 substantially above the lower end of the screen guide 9 and above the solution level 3. This claw conveyor 19 is inclined upwardly and has its upper end played around suitable sprockets or drive rollers 22 spaced above the top of the tank 1. Under the upper end of the claw conveyor 19 is a transverse belt conveyor 23 extending the full length across and above the tank 2 and also above the previous conveyor 12 at a point spaced from the discharge end 11 of the tank 1. This belt conveyor 23 moves away from the tank 1 so as to carry the graded potatoes away from the first tank 1 to sacking or other disposal. A perforated guide plate 24 extends across and above the tank 1 and below the claw conveyor 19 so that the lower end 26 of the perforated plate 24 curves into the solution in the tank 1 slightly below the solution level 3, and the upper end 27 of the perforated plate 24 curves over the edge of the transverse belt conveyor 23. It is to be noted that the space under the upper end of the claw conveyor 19 is sufficiently large to allow potatoes of any size to be discharged thereunder and over the upper end 27 of the perforated plate 24 and onto the top of the transverse belt conveyor 23. From the claw conveyor 19 extend a plurality of slightly curved claws 28 which extend transversely the entire width of said conveyor 19 and are suitably spaced from each other. The height of these claws 28 is such that they extend into the solution near and at the lower end of the claw conveyor 19 and leave the solution at about the lower end 26 of the perforated plate 24, and are in sufficient closeness to the perforated plate 24 to skim off the floating potatoes along the top of the perforated plate 24 and onto the transverse belt conveyor 23. In this manner the floating potatoes are skimmed off the solution level 3 and discharged as one grade over the transverse belt conveyor 23. The claws 28 curve toward the direction of conveyor movement.

In order to keep the solution and the potatoes agitated and prevent the jamming of the potatoes and of the mechanism at the guide screen 9, a transverse rotating impeller 29 is provided above the lower end of the screen guide 9 and spaced therefrom. This impeller may be in any suitable form. In the present form it is illustrated as a paddle wheel with four blades 31 intersecting toward the center to form a hub 32 and held together by rings 33 at the ends thereof. The wheel is journalled on a suitable shaft 34 and is power driven. The direction of rotation of this paddle wheel 29 is in a clockwise direction viewing Fig. 1 and is so geared that it gently agitates the potatoes and advances them down on the screen guide 9 and then away and over the lower end of the conveyor 12. This advancement of the potatoes off the screen guide 9 and over the conveyor 12 is accomplished primarily by the current created in that direction by the paddle wheel 29, which prevents the piling up of the potatoes at the lower end of the screen guide 9. The same current on the discharge side of the paddle wheel 29 will facilitate the advancement and freeing of the floating potatoes toward the upper perforated plate 26 or toward the level 3 of the solution in the tank 1. It also keeps the solution of uniform density throughout the entire tank 1.

The potatoes during this process will carry off certain of the solution adhering to their surfaces and for its replacement any suitable automatic mechanism may be used, such as a floating valve 36 which controls the passage of the solution from a reserve tank 37 so as to admit additional solution from the reserve tank 37 into the tank 1 whenever the solution level 3 falls below the predetermined level. It is to be also noted that suitable rinsing sprays are provided above the transverse belt conveyor 23 to wash the graded potatoes carried thereon.

The second tank 2 is identical in construction and in the advancing and grading mechanism to the mechanism heretofore described in connection with the first tank 1 except that there is no transverse conveyor for the intake of the potatoes because the potatoes are dropped into the second tank from the end of the lower grading conveyor 12 of the first tank 1. Thereafter the potatoes are graded in the second tank in the same manner as heretofore described the heavier potatoes sink and the potatoes of lighter specific gravity are skimmed off as they float in said solution. In the two tanks shown in the illustration, potatoes can be graded into three grades, namely: the poorest grade carried away on the transverse belt conveyor 23 of the first tank 1, the specific gravity of which is lighter than the specific gravity of the solution in the first tank 1; the second grade or intermediate grade of potatoes are floated off the solution in the second tank 2 and are of higher specific gravity than the solution in the first tank 1 but of lighter specific gravity than the specific gravity of the solution in the second tank 2; the third grade is dumped out at the upper end of the lower grading conveyor in the second tank 2 at the discharge end of the second tank 2 and is of heavier specific gravity than the solution in said second tank 2. The potatoes may be further graded when required by additional series of tanks in the same manner as the grading into the three grades accomplished in the two tanks herein illustrated.

The grading will provide potatoes of substantially uniform starch content, especially with respect to all the potatoes graded being above a given starch content. The same qualities are needed for good dehydrated potatoes as for good quality of potatoes for cooking or for other commercial uses. To produce more uniformly such high quality potatoes, seed stocks can be similarly graded, irrespective of size, in the same grading mechanism so that the planter is assured that his crop will be uniformly above a certain minimum solid or starch content. This quality of potatoes is hereditary and therefore the grading of seed stocks is of great importance in improving the quality of potato crops.

The conveyors and mechanisms in each unit are driven in synchronism so as to handle a suitable quantity of potatoes with a high rate of efficiency. On the discharge end 11 of the first tank 1 is suitably mounted an electric motor 38 which is preferably a gearhead motor of the variable speed type so as to allow a regulation of all the movements in the device in accordance with the volume handled. The motor 38 is connected to the leading sprocket or roller 16 of the lower grader conveyor 12. Suitable driving means such as a chain 39 transmits rotation from the sprocket of the roller 16 of the lower conveyor 12 to the drive sprocket at the leading end 22 of the upper claw conveyor 19. Another chain and sprocket drive 41 connects the trailing end 21 of the upper claw conveyor 19 with the shaft of the paddle wheel 29 for rotating the latter as heretofore described. A similar drive mechanism is provided for the mechanisms in the second tank 2. The units can be made up separately and then placed together in series according to the number of gradings required. In the present illustration the sunk or heavier potatoes from the second tank 2 are discharged upon a delivery conveyor 42 which carries this highest grade of potatoes to be rinsed and to be properly packed.

I claim:

1. A device for grading potatoes and other root crops, comprising a tank, a liquid of predetermined specific gravity maintained at a constant level in said tank, means to introduce root crops into said tank at one end thereof, an inclined guide extended downwardly from said end of said tank to guide the sinking root crops downwardly in said liquid, a conveyor extended from below the end of said guide upwardly and over the other end of said tank for receiving the sinking root crops from said guide and carrying said root crops out of said liquid and over said second end of said tank, a substantially flat and perforate guide above the tank extended into said liquid near the surface thereof, an endless conveyor having longitudinally spaced transversely extending claws above said guide to skim the floating root crops onto said second guide and push said floating root crops on said second guide and to above said tank, means to receive and carry away the graded floating root crops from said second guide, means to drive said conveyor and said mechanism, and a rotating agitating mechanism aligned with the lower end of said first inclined guide and being between the lower ends of said conveyor and said skimming mechanism for agitating said liquid and for freeing floating root crops from the sinking root crops.

2. A device for grading potatoes and other root crops, comprising a tank, a liquid of predetermined specific gravity maintained at a constant level in said tank, means to introduce root crops into said tank at one end thereof, an inclined guide extended downwardly from said end of said tank to guide the sinking root crops downwardly in said liquid, a conveyor extended from below the end of said guide upwardly and over the other end of said tank for receiving the sinking root crops from said guide and carrying said root crops out of said liquid and over said second end of said tank, a guide above the tank extended into said liquid near the surface thereof, a mechanism above said guide to skim the floating root crops onto said second guide and push said floating root crops on said second guide and to above said tank, means to receive and carry away the graded floating root crops from said second guide, means to drive said conveyor and said mechanism, said root crops introducing means including a transverse conveyor extended above the intake end of said tank, and a plurality of shearing elements inclined to push the root crops off of said transverse conveyor substantially uniformly across the width of the tank.

FRANK L. LATHROP.

REFERENCES CITED

The following references are of record in the file of this patent:

UNITED STATES PATENTS

| Number | Name | Date |
|---|---|---|
| 1,572,055 | Warren | Feb. 9, 1926 |
| 1,643,596 | Zuckerman | Sept. 27, 1927 |
| 556,111 | Talbot | Mar. 10, 1896 |
| 515,542 | Webb | Feb. 27, 1894 |
| 1,286,554 | Dekker | Dec. 8, 1918 |
| 945,692 | Campbell | Jan. 4, 1910 |